· US010688608B2

(12) United States Patent
Autran et al.

(10) Patent No.: US 10,688,608 B2
(45) Date of Patent: Jun. 23, 2020

(54) RING GEAR FOR AN EPICYCLIC REDUCTION GEAR

(71) Applicant: Safran Transmission Systems, Colombes (FR)

(72) Inventors: Pauline Marie Cécile Autran, Moissy-Cramayel (FR); Guillaume Beck, Moissy-Cramayel (FR); Boris Morelli, Moissy-Cramayel (FR); Jordane Peltier, Moissy-Cramayel (FR); Jean Clayette, Moissy-Cramayel (FR)

(73) Assignee: Safran Transmission Systems, Colombes (FR)

(*) Notice: Subject to any disclaimer, the term of this patent is extended or adjusted under 35 U.S.C. 154(b) by 2 days.

(21) Appl. No.: 15/768,401

(22) PCT Filed: Oct. 13, 2016

(86) PCT No.: PCT/FR2016/052651
§ 371 (c)(1),
(2) Date: Apr. 13, 2018

(87) PCT Pub. No.: WO2017/064429
PCT Pub. Date: Apr. 20, 2017

(65) Prior Publication Data
US 2018/0297157 A1    Oct. 18, 2018

(30) Foreign Application Priority Data
Oct. 16, 2015   (FR) ...................................... 15 59918

(51) Int. Cl.
*F16H 57/08* (2006.01)
*B23P 15/14* (2006.01)
*F16H 55/17* (2006.01)

(52) U.S. Cl.
CPC .............. *B23P 15/14* (2013.01); *F16H 55/17* (2013.01); *F16H 57/08* (2013.01); *F16H 2055/176* (2013.01)

(58) Field of Classification Search
CPC .......... B23P 15/14; F16H 55/17; F16H 57/08; F16H 2055/176
See application file for complete search history.

(56) References Cited

U.S. PATENT DOCUMENTS 2,932,992 A * 4/1960 Larsh .................... F16H 1/2818
                                                475/176
5,234,389 A * 8/1993 Goates ...................... F16H 3/66
                                                188/82.3
(Continued)

FOREIGN PATENT DOCUMENTS

CN          103192241 A      7/2013
DE          43 04 657 A1     11/1993
(Continued)

Primary Examiner — Rick K Chang
(74) Attorney, Agent, or Firm — Blank Rome LLP

(57) ABSTRACT

A method for aligning toothing in an assembly of two half-ring gears is provided:
  an angular positioning pin is provided which is to be received in respective holes of the half-ring gears;
  the holes are drilled on the first half-ring gear such that the first hole has a first cross-section that is smaller than the final cross-section thereof;
  the angles between the teeth are compared between the two half-ring gears, and an angular difference between said angles of the half-ring gears is deduced therefrom;
  the first hole is redrilled to the final cross-section, while the centre of the hole is angularly shifted by the value of the angular difference;
  the pin is engaged in the holes, and the half-ring gears are then assembled using an interference fit.

7 Claims, 2 Drawing Sheets

(56) References Cited

U.S. PATENT DOCUMENTS

| | | | |
|---|---|---|---|
| 6,422,924 B1 | 7/2002 | Faulstich et al. | |
| 10,203,022 B2* | 2/2019 | Atmur | H02K 41/06 |
| 2017/0219079 A1* | 8/2017 | Niergarth | F02C 7/36 |
| 2018/0023676 A1* | 1/2018 | Durling | F16L 3/12 |
| | | | 475/347 |
| 2018/0038448 A1* | 2/2018 | Matsuoka | F16H 1/2818 |
| 2018/0290278 A1* | 10/2018 | Peltier | F16H 57/023 |
| 2019/0024776 A1* | 1/2019 | Wilson | F03D 15/00 |

FOREIGN PATENT DOCUMENTS

| | | |
|---|---|---|
| EP | 1036624 A3 | 9/2000 |
| FR | 2 987 416 A1 | 8/2013 |
| RU | 2263043 C2 | 10/2005 |

\* cited by examiner

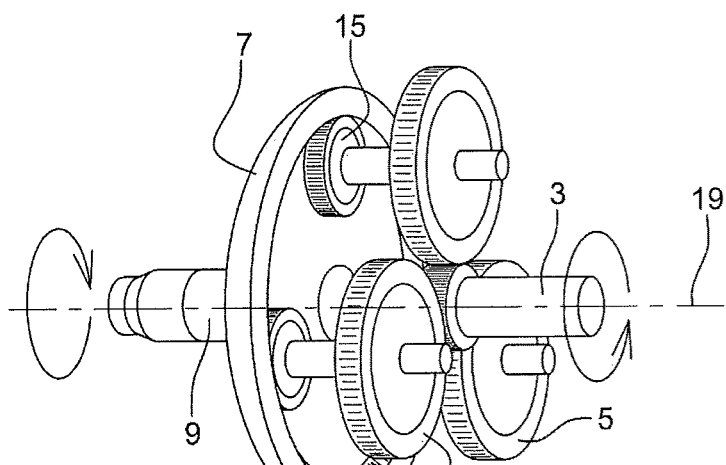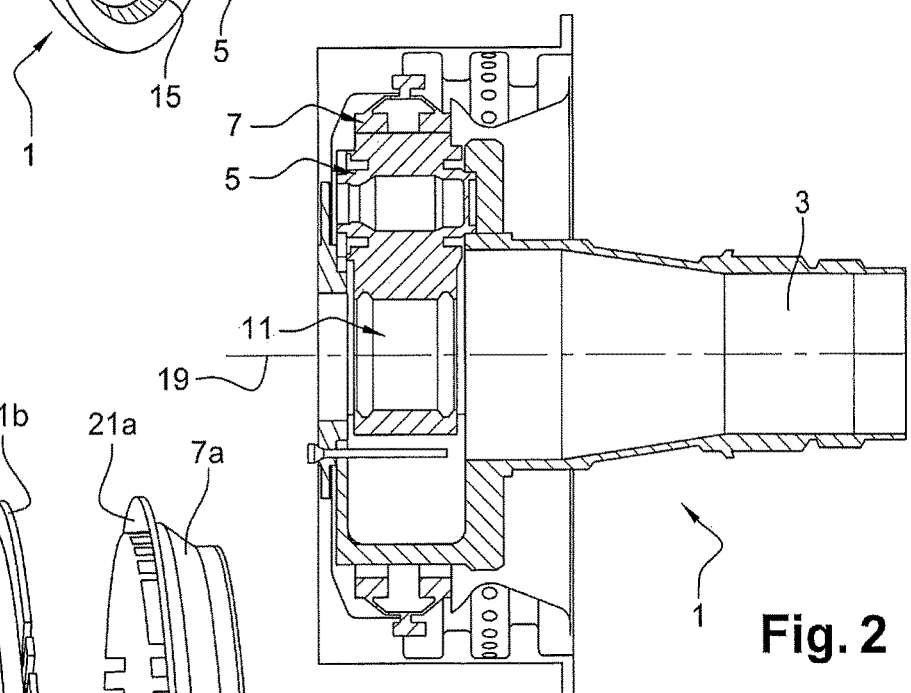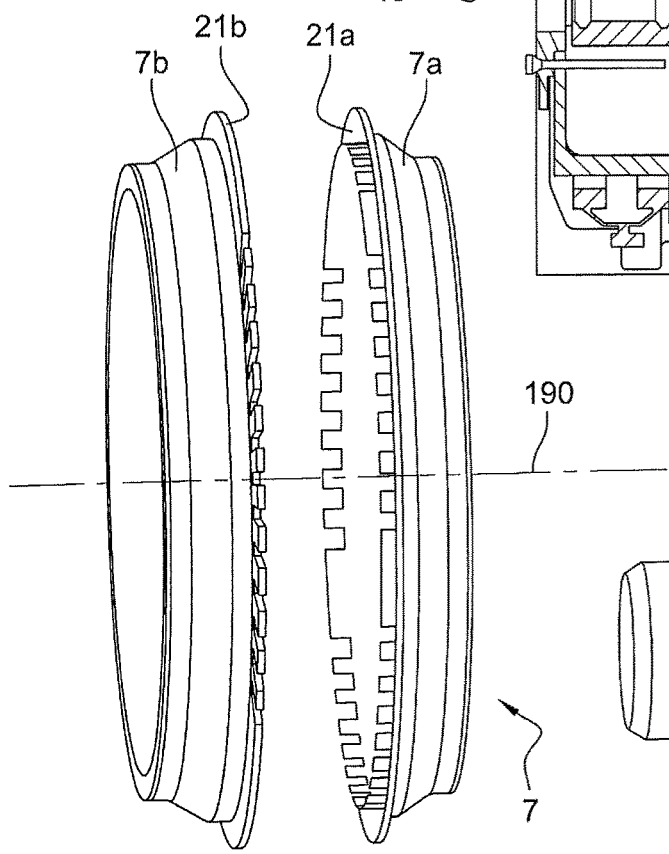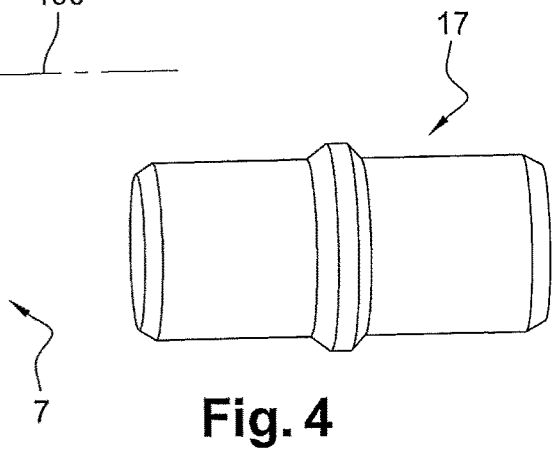

RING GEAR FOR AN EPICYCLIC REDUCTION GEAR

CROSS-REFERENCE TO RELATED APPLICATIONS

This application is a national stage of International Application No. PCT/FR2016/052651, filed on of Oct. 13, 2016, which claims the benefit of French Patent Application No. 1559918, filed Oct. 16, 2015, the contents of each of which are incorporated herein by reference.

TECHNICAL FIELD

This invention relates to obtaining a ring gear to be mounted in an epicyclic reduction gear.

BACKGROUND

The epicyclic reduction gears are frequently used in reduction units of aircraft turboprop engines, to allow a reduction in speed between the drive line and the propeller.

The teeth are major elements of the reduction gear since they transfer the power from the input shaft to the output shaft.

Typically, an epicyclic reduction gear comprises a combination of coaxial elements, one or more of which are ring gears, planet carriers which rotate around the common axis and which carry one or more planets meshing with one or more sun gears.

And in some cases, it is useful that the ring gear or gears be made in two parts which are assembled.

Thus, in an epicyclic or planetary gear train, on a herringbone toothing, namely a toothing composed of two helical gears set in opposition so as to cancel the axial force as it is necessary that one of these elements, the sun gears, the planet gears, or the ring gears, be in two parts.

For manufacturing reasons, it is preferable that the ring gear be in two parts, that is to say in two half-ring gears, with the understanding that the expression "two half-ring gears" means two annular rings, a priori identical, or essentially identical, but each has, coupled with the common axis of the half-ring gears, a lesser thickness (for example by half) with respect to that of the final ring gear obtained by the coaxial assembly of the two half-ring gears.

Given that the aim here is to ensure a zero radial clearance between the two half-ring gears in question, which imposes a interference fit between them, and that it is possible for a tooth of one of the half-ring gears not to be aligned with the corresponding tooth on the second half-ring gear, a problem therefore arises regarding the offset of the teeth of the half-ring gears in relation to each other: how to assemble these half-ring gears assembled while ensuring the alignment of their teeth?

SUMMARY

It is with a view to providing a solution to this problem, within the context of a serial production, at reduced cost (in terms of response time) that according to the invention, in order to align the teeth of said toothing, the following steps should be followed:

an angular positioning pin is provided for the half-ring gears in relation to each other, the pin to be received in the first and second respective holes of the said first and second half-ring gears, must each have a final cross-section adapted to the pin;

with reference to the pre-established manufacturing drawing, the first and second holes are drilled such that the first hole has a first cross-section that is smaller than the said final cross-section on the first half-ring gear and that the second hole has a second section equal to the said final cross-section on the second half-ring gear, for each half-ring gear:

Several equidistant teeth from each other are indexed, with a first tooth which is closer to the hole of its respective half-ring gear than the other teeth, to define a common frame to both half-ring gears;

on each tooth indexed, the multidimensional coordinates, with respect to the centre of the half-ring gear, of (at least) a reference point are determined;

the determined multidimensional coordinates are compared with theoretical coordinates of these same points from the pre-established manufacturing drawing;

a difference is noted between the determined coordinates and the theoretical coordinates for defining a positional deviation of said points;

the first hole is re-drilled to said final cross-section, positioning or centering it based on the positional deviations of the reference points of each half-ring gear such that, during assembly, each tooth indexed to the first half-ring gear facing a tooth indexed from the second (opposite) half-ring gear, parallel to said axis, according to the common frame, and the first and second half-ring gears are assembled by tightly engaging said angular positioning pin in the first and second holes, and by an interference fit of the half-ring gears together.

This interference fit and the consideration of an offset due to toothing with non-identical angular positions between the two half-ring gears will secure the realization of a complete ring gear without axial misalignment of its two half-toothing.

And only drilling the hole smaller in relation to the finish dimensions in only one of the two half-ring gears, rather than carrying out this operation on both half-ring gears, has the advantage of enabling the angular resetting without multiplying any measures leading to a loss of precision in such resetting.

To further secure the attainment of a major zero radial clearance for optimized performance of an epicyclic reduction gear, it is further recommended that the assembly step of the first and second half-ring gears comprises a shrink fit assembly. This makes it even more useful to take into account a possible angular offset between the teeth of the half-ring gears, thereby justifying the above method. Indeed, once shrink fitted:

there is a risk of rotating material pull-out, the tools and the method to follow are complex (see below).

Another problem taken into account was that concerning how to determine, with safety, reproducibility and as simply and reliably as possible, the positional deviation of said points on the first and/or second half-ring gears.

For this purpose, it is advisable to locate each reference point on both the active flank and on the pitch circle of the half-ring gear concerned.

We define:

the active flank of a tooth as the lateral face of the tooth or only a part of such face which comes into contact with the teeth of the mating gear, and the pitch circle as the straight section of the pitch cylinder; its diameter is the pitch diameter.

It is equally recommended that the coordinates of each reference point be three-dimensional, said reference point being then on a middle (axial) extension plane of the tooth concerned.

This will solve the difficulty of defining the area where to measure the position of the tooth in relation to the hole of the guidance pin. Indeed, this area should be sufficiently accessible for the measuring device, this measurement should be repetitive and the measured value should be truly reliable.

In addition, it is advisable that before determining, on each indexed tooth, the multidimensional coordinates of the reference point(s), at least three equidistant teeth from the other should be defined one, and preferably four equidistant teeth from each other should be defined and thus distributed at 90° in pairs.

Advantageously, the measurements will then be averaged on each half-ring gear.

In this way, the accuracy and quality of the final assembly will be secured through optimized measurement accuracy.

BRIEF DESCRIPTION OF THE DRAWINGS

The various aspects of the solutions presented herein will, if necessary, be better understood and other details, characteristics and advantages thereof will become apparent upon reading the following description as a non-exhaustive example with reference to the appended drawings wherein:

FIG. 1 is a diagram of the situation of the teeth in a reduction gear for a turbine engine propeller, the planet gear carrier which is fixed in relation to the frame, is not shown in the drawing, FIG. 2 outlines the inside of a planetary or epicyclic reduction gearbox, FIG. 3 is the initial step of a coaxial assembly (axis 190 of the ring gear) between a first and a second half-ring gears, FIG. 4 outlines an assembly pin to angularly wedge together the half-ring gears, FIGS. 5, 6, 7 partially show both half-ring gears

DETAILED DESCRIPTION

Figure 5:
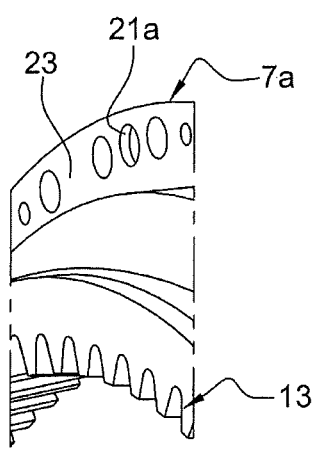

Placed between the turbine and the propeller axis, the role of the reduction gear is to reduce the speed of rotation of the propeller. FIG. 1 thus shows very diagrammatically a planetary or epicyclic reduction gear 1. The planet carrier which is fixed with respect to the frame is not shown in the drawing below. It shows at 3 the turbine (input) shaft, and at 5 and 7, respectively planet gears and a ring gear of the epicyclic reduction gear 1. The (output) shaft of the propeller is at 9.

FIG. 2 shows the turbine shaft 3, the central sun gear 11, the zone 5 of the planet gears, or planetary gears, and the peripheral ring gear 7 with inner teeth, here helical.

In the example, it is an epicyclic gear train with herringbone toothing.

For manufacturing reasons, it was considered preferable for the ring 7 to be in two parts, that is to say in two half-ring gears 7a, 7b, as shown diagrammatically in FIG. 3.

The detail drawing of FIG. 5 outlines the embodiment of each of these half-ring gears 7a, 7b, equally. Thus, each of them comprises an inner teeth, here helical, 13 over its entire inner periphery, just as what is illustrated with the same frame FIG. 1, such that it meshes with the outer teeth 15 of certain planet gears, at least.

A precise relative positioning of both half-ring gears 7a, 7b must be ensured.

As shown diagrammatically in FIG. 5, a guidance pin 17, or an angular positioning pin of the half-ring gears with respect to each other is provided for this purpose. It will enable an alignment of the teeth of both half-ring gears.

To complete the effect provided by this pin, it is recommended that, once well positioned in relation to each other, with their teeth 13 aligned, along with the (common, as in the example) axis 19 of the turbine shaft and the propeller 9, these first and second half-rings 7a, 7b be assembled by a interference fit, and in this case by shrink fit.

It should be recalled that a shrink fit consists of surrounding an inner piece called the "enveloped part" by an outer part called the "enveloping part". The assembly is made with machining tolerances that prohibit its assembly by hand or even by press fit. One solution, when possible without deteriorating the material, is to heat the enveloping part to expand it before putting it on the part to be enveloped.

Such a shrink fit assembly implies that, for the relative angular positioning of the half-ring gears, it is no longer possible to rotate them in relation to each other about their central axis, once shrink fitted. Indeed, there is a risk of rotating material pull-out, and the tooling to be achieved is complex because the force required to ensure relative rotation between the half-ring gears is therefore considerable, because of the shrink fitting. Moreover, this method would require precise control of the movements for the corrective rotations are weak after the first positioning.

The solution proposed, in summary, is to drill, for the pin 17, in one of the two half-ring gears a hole which is smaller than the dimension in the plan, to measure the angular offset of the respective teeth of both half-ring gears 7a, 7b, and finally to redrill the hole to the finished dimensions, before the final assembly.

In more detail, the proposed method comprises the following steps:

Firstly, we will consider the angular positioning pin 17 of the half-ring gears 7a,7b in relation to each other, in that it will have to be received in the first and second respective holes 21a,21b of the said first and second half-ring gears as these holes must each have a final cross-section adapted to the pin.

The holes 21a, 21b will each be arranged, along an axis parallel to the common axis 190 of the first and second half-ring gears.

Advantageously, they will each be arranged in a peripheral radial part 23 of the half-ring gear concerned surrounding the inner toothing 13, substantially perpendicular to it.

Figure 6:
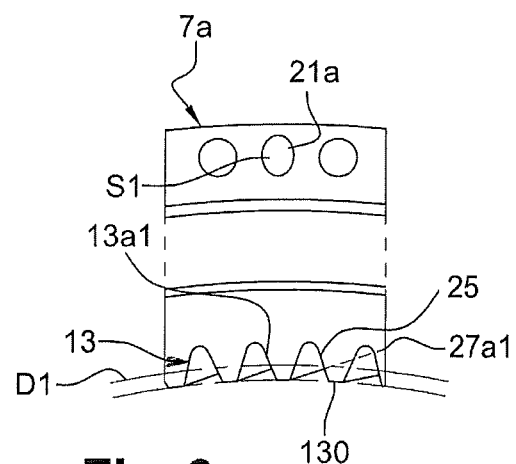
Figure 7:
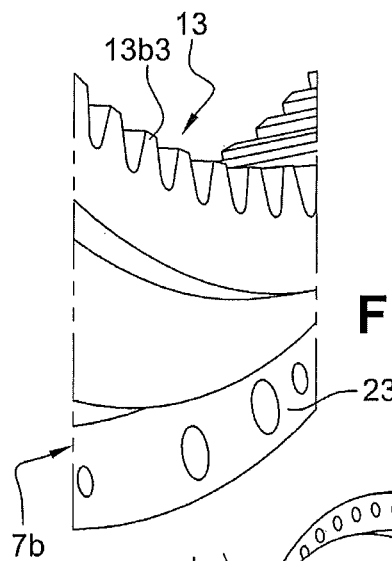

A peculiarity lies in the fact that the first and second holes 21a, 21b are drilled such that:

the first hole 21a will have a first cross-section, such as S1 FIG. 6, smaller than said final cross-section on the first half-ring gear 7a, and that the second hole 21b has a second cross-section equal to said final cross-section on the second half-ring gear 7b.

Typically, the aforementioned sections may be diameters (holes with a circular cross-section).

Both holes 21a, 21b have been drilled at the same theoretical location.

As illustrated in FIG. 6 for a given tooth, each tooth, such as that indexed 13a, will have an active flank 25 and all the teeth of the first, respectively the second, half-ring gear will extend radially up to their area of the internal end section 130, with the same theoretical pitch diameter indexed D1.

Figure 9:
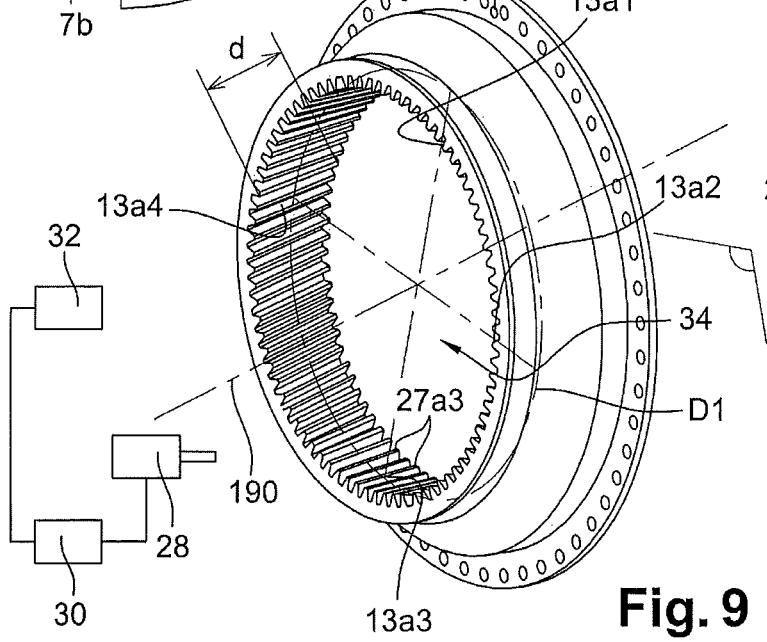
FIG. 9 shows the characteristic teeth marked for taking the potential manufacturing difference between the two half-ring gears.

Having done that, we are going to define and mark, on each toothing, several teeth equidistant from each other, such as 13a1,13a2,13a3,13a4 FIG. 9, with a first tooth which is closer to the hole (21a FIG. 9) of its half-ring gear than the other teeth, so as to define a common frame to both half-ring gears. Indeed, at the time of the final assembly of both half-ring gears, it is important that they be positioned co-axially, face to face, with the same relative angular position of said "indexed teeth".

Then, on each indexed tooth will be determined the multidimensional coordinates, with respect to the centre of the half-ring gear (axis 190), of a reference point.

Three-dimensional coordinates (orthonormal coordinate system x, y, z) are a priori preferred to two-dimensional coordinates (x, y in particular);

These multidimensional coordinates taken are then going to be compared with the theoretical coordinates of these same points from the pre-established manufacturing drawing.

In practice, this calculation of the theoretical coordinates would have been acquired much earlier by 3D survey from the pre-established manufacturing drawing.

To present the foregoing otherwise, we can consider that, to measure the possible offset between the herringbone toothing of both half-ring hears:

on the first half-ring gear, the one 7a with the hole 21a of the guidance pin drilled smaller than the finished dimension:
  a/ the aforementioned teeth 13a1, 13a2, 13a3, 13a4 will be indexed. The first tooth is therefore the tooth closest to the hole 21a of the guidance pin;
  b/ with a three-dimensional spotting machine 28, a point (marks 27a1, 27a3, FIGS. 6 and 9, respectively for the teeth 13a1, 13a3) will be indexed or identified on each of these teeth which will thus be located favourably on the active flank, on the pitch circle (D1) and in the middle of the tooth, that is to say at mid-axial length d/2, as shown in the illustrations (see the middle (axial) extension plane 34 of the tooth in question FIG. 9).
  c/ considering that the coordinates of said tooth will be noted x1, y1, z1 in the associated computer 30, connected to the data recording machine 28, thanks to 3D readings stored in the machine memory 32 and initially made with reference to the pre-established manufacturing drawing of said half-ring gears, the theoretical position of each aforementioned point marked (such as 27a1) will also be available, its theoretical three-dimensional coordinates being denoted x2, y2, z2;
  d/ by calculating, using the calculator 30, the difference between the coordinates x1, y1, z1 and x2, y2, z2, the gap E of the coordinates (in the three axes x, y, z, in the example explained here) between the theoretical position and the actual position can therefore be determined.
on the second half-ring gear with the hole 21b to the finished dimensions, steps a) to d) above will be reproduced.

In this way, the said gap E on each half-ring gear in relation to the theoretical position will be known, for the teeth (or half-teeth) concerned; that is to say the position envisaged by the manufacturing drawing.

And the hole 21a of the first half-ring gear can then be redrilled to the finished dimensions by shifting so as to have between both half-ring gears the desired gap E.

Even if the aforementioned location of the holes 21a, 21b is "the same" on both half-ring gears 7a, 7b if superimposed, it will thus be possible to take into account the non-identity of the shapings of their respective teeth, which is usual in practice.

Once this is done, the first and second half-ring gears are assembled along the common axis 190 by tightly engaging said pin 17 in the first and second holes 21a, 21b, and by a peripheral interference fit of the half-ring gears between them, favourably by shrink fit.

To be sure of the quality of the inner teeth 13 of the half-ring gears 7a, 7b, it is furthermore recommended that before any drilling is done, a rectification of these toothings should be carried out, on each half-ring gear, separately. Thus, the teeth will have a precise and perfect appearance.

It should be understood that the essence is the search for an accuracy or precision in positioning the holes to be drilled and hence in that of the half-ring gears in relation to each other, angularly speaking, that it is advisable to first calculate the gap E:

to perform measurements from three and preferably (at least) four teeth separated in pairs by 90°, on each half-ring gear;

and then averaging these measurements, on each half-ring gear 7a, 7b, by calculating an arithmetic average.

Thus, in practice, it will be preferable, on each half-ring gear, to measure the gap between the theoretical position of four teeth at 90° and the actual position of these same teeth (see FIG. 9), then to arithmetically average the four differences obtained, the ("corrected", if necessary) re-drilling of the hole of the guidance pin on the half-ring gear where it had been drilled smaller thereby cancelling any angular error.

Once the holes 21a, 21b are correctly drilled, it will be possible to tightly engage the pin 17 partially in each of these holes, then assemble the first and second half-ring gears by the axially tight fit provided.

Figure 8:
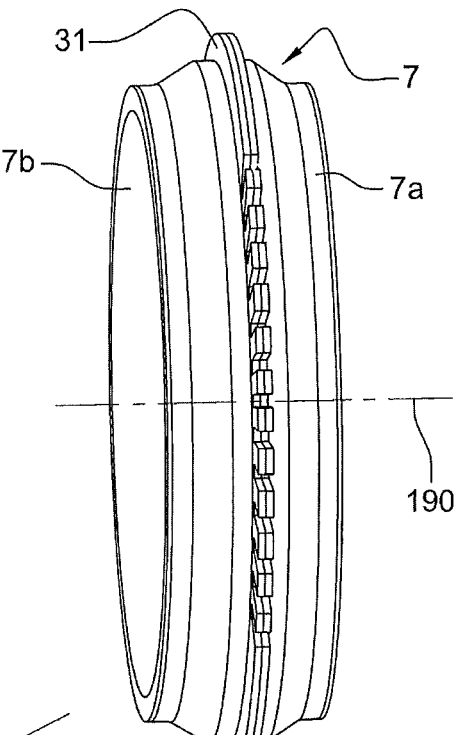
FIG. 8 shows a complete ring gear, assembled, shrink fitted.

FIG. 8 is a diagrammatic representation at 31 of the enveloping part surrounding and axially tightening together the two peripheral radial parts 23 thus co-axially joined (axis 190) to form the final single ring gear 7.

The invention claimed is:

1. A method for assembling first and second half-ring gears according to a common axis, the method comprising:
  providing an angular positioning pin for the first and second half-ring gears in relation to each other, the angular positioning pin to be received in first and second respective holes of the said first and second half-ring gears, wherein the first and second respective holes each have a final cross-section adapted to the angular positioning pin;
  with reference to a pre-established manufacturing drawing, drilling the first and second holes such that the first hole has a first cross-section that is smaller than the final cross-section on the first half-ring gear and that the second hole has a second cross-section equal to the said final cross-section on the second half-ring gear,
  for each of the first and the second half-ring gears:
    indexing or defining a plurality of teeth equidistant from each other, with a first tooth that is closer to the respective hole of its respective half-ring gear than the other teeth, to define a common index mark to the first and second half-ring gears;

determining on each tooth indexed, multidimensional coordinates with respect to a center of the respective half-ring gear, of a reference point;

comparing the determined multidimensional coordinates with theoretical coordinates of these same points from the pre-established manufacturing drawing;

noting a difference between the determined multidimensional coordinates and the theoretical coordinates for defining a positional deviation of said reference points;

redrilling the first hole to said final cross-section, positioning the first hole based on the positional deviations of the reference points of each half-ring gear such that, during assembly, each tooth indexed to the first half-ring gear faces a tooth indexed from the second half-ring gear, parallel to said axis, according to a common frame, and assembling the first and second half-ring gears by tightly engaging said angular positioning pin in the first and second holes, and by an interference fit of the first and second half-ring gears together.

2. The method according to claim 1, wherein each reference point is located on both an active flank and on a pitch circle of the respective half-ring gear.

3. The method according to claim 1, wherein the multidimensional coordinates of each reference point are three-dimensional, said reference point being on a middle extension plane of the respective tooth.

4. The method according to claim 1, wherein the assembly step of the first and second half-rings comprises an interference fit assembly.

5. The method according to claim 1, wherein before drilling the first and second holes, the toothing on each half-ring gear is separately rectified.

6. The method according to claim 1, wherein for each half-ring gear, at least three teeth equidistant from each other are defined.

7. The method according to claim 1, wherein for each half-ring gear, four teeth equidistant from each other are defined and distributed at 90 degrees in pairs.

* * * * *